(12) United States Patent
Margulis et al.

(10) Patent No.: US 6,243,449 B1
(45) Date of Patent: Jun. 5, 2001

(54) MASS CALLING EVENT DETECTION AND CONTROL

(75) Inventors: Eugene E. Margulis, Toronto (CA); Weilin W. Wang, Plano, TX (US); Anton Driesse; Andre A. LeBon, both of Montreal (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/045,377

(22) Filed: Mar. 20, 1998

(51) Int. Cl.[7] .............................. H04M 15/00; H04M 7/00
(52) U.S. Cl. ............................................ 379/113; 379/220
(58) Field of Search .................................. 379/113, 111, 379/112, 115, 134, 135, 220

(56) References Cited

U.S. PATENT DOCUMENTS

| | | | |
|---|---|---|---|
| 5,295,183 | 3/1994 | Langlois et al. | 379/113 |
| 5,450,483 | * 9/1995 | Williams | 379/279 |
| 5,828,729 | * 10/1998 | Clermont et al. | 379/34 |
| 5,878,224 | * 3/1999 | Smith | 395/200.54 |
| 5,923,742 | * 7/1999 | Kodialam | 379/133 |
| 5,974,126 | * 10/1999 | Hollas et al. | 379/137 |

* cited by examiner

Primary Examiner—Ahmad Matar
Assistant Examiner—Hector Agdeppa (57) ABSTRACT

A method for handling congestion in a communication network, known as a focussed mass calling event (MCE), occurring when the rate of calls to any given terminating number increases dramatically resulting in a large number of incomplete calls directed towards that number, known as ineffective attempts. Switches in the network operate under control of a network processor and ineffective attempts are logged and monitored by the switches. If the number of ineffective attempts on a switch for a particular terminating number exceeds a threshold in a given sampling interval, an MCE is detected on the switch and reported to the network processor along with the terminating number. The network processor responds by periodically broadcasting a gap control message to all the switches of the network identifying the congested terminating number and a gap time. The switches respond to the gap control message by placing a guard-time between calls to the particular terminating number based on the gap time. The switches also periodically report on the number of blocked and passed calls to the MCE terminating number which information is used by the network processor to adjust the gap time in the gap control message. This process continues until the congestion at the terminating number is alleviated.

16 Claims, 4 Drawing Sheets

MASS CALLING EVENT DETECTION AND CONTROL

BACKGROUND OF THE INVENTION

This invention relates to a method and system for avoiding congestion in a network of switches (nodes) due to a mass calling event (MCE).

A terminating number (TN) is a destination number serviced by a terminating switch (which switch may be inside or outside a given switch network). A focussed MCE occurs where the rate of calls to any given TN (the "congestion TN") increases dramatically resulting in a large number of incomplete calls directed towards that number. For example, where a TN is a number for a ticket outlet, a focussed MCE may occur as soon as tickets for a popular concert go on sale.

Most circuit switched communications networks allocate a call path in a forward fashion in that they will begin routing of each call until the call is blocked by a network element which is "busy" (i.e., fully occupied). In such a network, a focussed MCE may quickly congest the entire network precluding calls to other TNs from being connected. Even if the focussed MCE does not congest the entire network, it will result in a waste of switching resources (causing unnecessary processing at each switch) and transmission resources (i.e., trunks between switches).

U.S. Pat. No. 5,295,183 issued March 15, 1994 to Langlois describes a system for coping with non-focussed MCEs (i.e., MCEs which are not caused by calls to one or a few specific TNs but result from general network congestion). In Langlois, switch occupancy rates are sent by each switch to a network processor (NP) on a periodic basis. When the occupancy rate of a switch exceeds a threshold, the NP sends back a recommendation to all switches in the network with an identifier of the congested switch and a call gap for calls to the congested switch. Upon receiving the recommendation, the switches begin timing a "call gapping time". When a switch receives a call that is directed toward the congested switch, if the call gapping time has elapsed, the call is routed as usual and the gapping time is reset. On the other hand, if a switch receives a call directed to the congested switch and the gap time has not elapsed, the call is blocked. When the NP receives new occupancy rates from the switches, it may broadcast a new recommendation. When the occupancy rate for a congested switch falls below a threshold, the NP may broadcast a message such that call gapping of calls directed to the previously congested switch ceases.

This invention seeks to cope with an MCE in a circuit switched communications network which allocates a call path in a forward fashion.

SUMMARY OF THE INVENTION

In accordance with the present invention, there is provided a method for handling a mass calling event (MCE) at a switch of a network, comprising the steps of, repetitively:
(a) logging ineffective attempts (IAs) to terminating numbers (TNs) which are on a monitoring list;
(b) sending a monitoring message to a network processor (NP) with the IA rate for each TN on said monitoring list;
(c) if, based on IAs logged in step (a), an IA rate in respect of a monitored TN is below a release threshold for a pre-determined time, removing said monitored TN from said monitoring list.

In accordance with another aspect of the present invention, there is provided a method for handling a mass calling event (MCE) at a switch of a network, comprising the steps of, repetitively:
(a) logging at least a portion of ineffective attempts (IAs) to at least a portion of terminating numbers (TNs) which are not on a monitoring list;
(b) logging IAs to TNs which are on said monitoring list;
(c) sending a monitoring message with the IA rate for each TN on said monitoring list;
(d) if, based on IAs logged in step (a), an IA rate in respect of a TN exceeds an alert threshold, sending an alert message specifying said TN and storing said TN on said monitoring list; and
(e) if, based on IAs logged in step (b), an IA rate in respect of a monitored TN is below a release threshold for a pre-determined time, removing said monitored TN from said monitoring list.

The alert and monitoring messages are received by a network processor which, in response, broadcasts call gapping messages to each switch of the network in respect of the TN(s) subject of the alert and monitoring messages. Each call gapping message instructs a switch to place a guard time between calls to the TN in the message.

In accordance with a further aspect of the present invention, there is provided a method for handling a mass calling event at a network processor (NP) of a network, comprising the steps of: receiving a monitoring message from at least one switch of said network specifying a controlled terminating number (TN), a number of calls blocked by said at least one switch due to application of a call gapping process and a number of calls passed by said at least one switch due to application of said call gapping process; broadcasting a call gapping message to switches on said network indicating a call gap to be applied to calls to said controlled TN, said call gap differing from switch to switch and, for a given switch, being based on a proportion of a sum of a number of calls to said controlled TN blocked and passed by said given switch to a sum of a number of calls to said controlled TN which are blocked and passed network-wide.

In accordance with yet another aspect of the present invention, there is provided a method for dynamically controlling access to a terminating number (TN) subject of a mass calling event (MCE) at a network processor (NP) of a first network, comprising the steps of: receiving a count of ineffective attempts (IAs) to the MCE TN from a first network detecting switch; determining an adjusted IA count as a sum of:
(i) IAs to said MCE TN resulting from calls arriving at said detecting switch on trunks from other switches in said first network and
(ii) a portion of a sum of:
(A) IAs to said MCE TN resulting from calls arriving at said detecting switch on local lines and
(B) IAs to said MCE TN resulting from calls arriving on trunks from outside of networks to which said detecting switch belongs determined by a ratio of:
(I) IAs to said MCE TN resulting from calls arriving on trunks from other switches in said first network to
(II) a sum comprised of, for each network of which said detecting switch is a part and which dynamically controls access to said MCE TN, IAs to said MCE TN resulting from calls arriving on trunks from other switches in said each network;

determining a call gap to apply to switches in said first network based on said adjusted IA count and; broadcasting a call gap message based on said call gap to switches in said first network.

BRIEF DESCRIPTION OF THE DRAWINGS

In the figures which illustrate example embodiments of the invention.

DETAILED DESCRIPTION OF THE PREFERRED EMBODIMENTS

Figure 1:
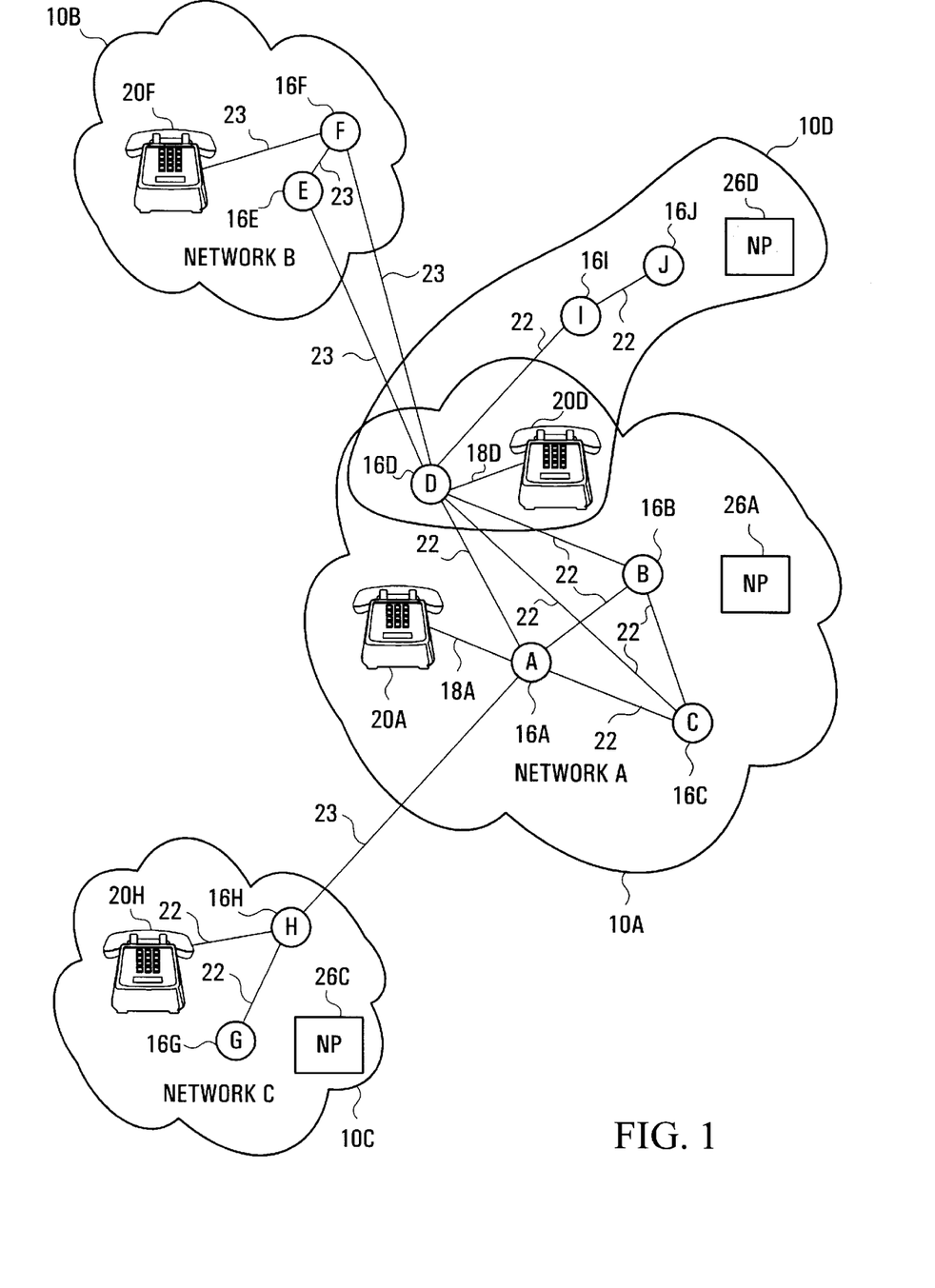
FIG. 1 is a schematic diagram of a communications system made in accordance with this invention.

Turning to FIG. 1, an exemplary communication system comprises networks 10A through 10D. Each network is comprised of a number of switches 16. Certain switches may be members of more than one network (as in the case of switch 16D of FIG. 1). Each of networks 10A, 10C, and 10D have a network processor (NP) 26; as will be described, a network with an NP provides dynamically controlled access (DCA) to TNs and is therefore referred to as a DCA network. An NP of a DCA network is linked to each of the switches 16 in the network (links not shown). Each switch is linked by lines 18 to telephone station apparatus 20 and by DCA trunks 22 or non-DCA trunks 23 to other switches. A DCA trunk 22 is a trunk which is completely contained within any one DCA network (such as the trunk between switches 16A and 16B of DCA network 10A and the trunk between switches 16D and 16I of DCA network 10D). A non-DCA trunk is a trunk not completely contained in any one DCA network (such as the inter-network trunk between switches 16H and 16A and the trunk between switches 16E and 16F of network 10B). The switches of each DCA network are under the control of the program illustrated in FIGS. 2a and 2b (loaded from computer-readable medium 30) and the NP of DCA network is under the control of the program illustrated in FIG. 3 (loaded from computer readable medium 32) which adapts the network for MCE detection and control.

MCE Detection

In order to identify an MCE in network 10A, a network standard sampling cycle is selected. During a given sampling cycle each network switch processes ineffective attempts (IAs) to terminating numbers (TNs). An IA results when a call to a TN arrives at a network switch and the network switch is unsuccessful in allocating or selecting the terminating agent during the normal operation of the switch or due to the application of manual network management controls. An IA does not result when a call is blocked by a switch in response to a call gapping command, as will be described hereinafter. By way of example, the terminating agent may be a local line or a trunk group. In such case, a switch will be unsuccessful in allocating or selecting the terminating agent when the terminating agent is a line which is busy, is a local trunk group with all of its members busy and no other routes available, or is a trunk group leading outside of the network which is allocated successfully but which needs to be released due to reception of a "release with cause" message sent back by the destination-switch due to congestion at that switch.

Figure 2A:
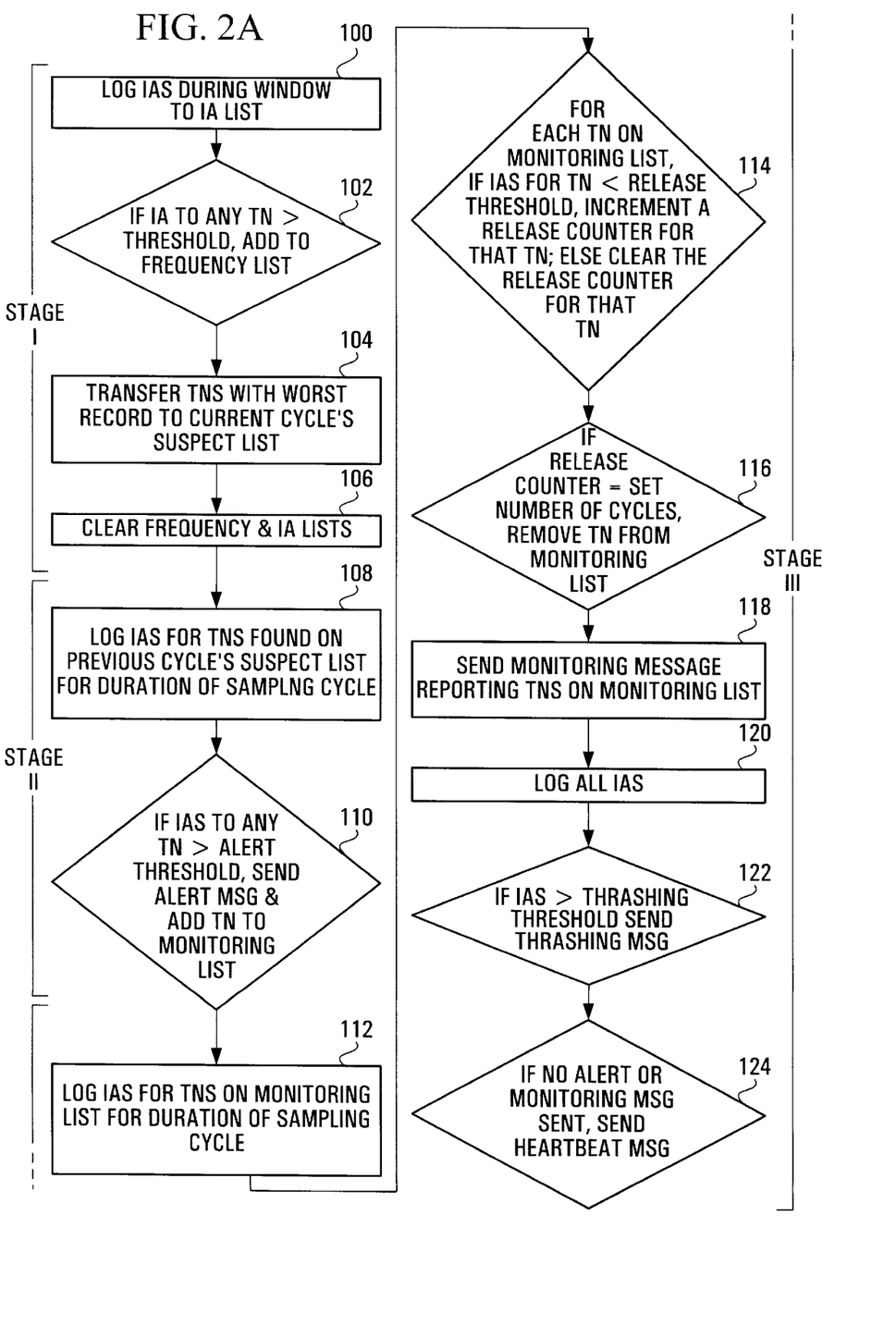
FIGS. 2a and 2b are flow diagrams for the program control of a network switches of FIG. 1.

Each network switch has four list types: an IA List; a Frequency List; a Suspect List; and a Monitoring List. With reference to FIG. 2a, during a sampling cycle, IAs are processed in three stages: Stage I, Stage II, and Stage III. To accomplish Stage I processing, the network switch, in principle, logs in the IA List all IAs to all TNs occurring during a sampling window, which window lasts a portion of the sampling cycle (block 100). However, IAs are not logged for TNs on a Suspect List created during the immediately preceding sampling cycle nor for TNs on the Monitoring List (instead, such IAs are logged in Stage II and Stage III processing, as is described hereinafter). Further, the number of TNs for which IAs are logged may be limited by the IA List size. At the end of the sampling window, the switch determines whether the IAs to any TN on the IA List exceed a threshold; if yes, the TN is added to a Frequency List (block 102). The TNs on the Frequency List are sorted by the number of IA counts per TN and those with the worst IA records are transferred to a Suspect List for use in the next sampling cycle (block 104); once this occurs, the IA List and Frequency List are cleared in preparation for the next sampling cycle (block 106).

To accomplish Stage II processing, all IAs for all TNs in the Suspect List created in the last sampling cycle are monitored for the entire duration of the current sampling cycle (block 108); at the end of the sampling cycle, if the number of IAs logged for a TN on the Suspect List exceeds an alert threshold, the switch reports the MCE along with the TN to a network processor (NP) for the network. The switch also then adds the TN to the Monitoring List (block 110).

From the foregoing, it will be apparent there are two Suspect Lists used during a sampling cycle: one which is being generated during Stage I processing and one which was generated by Stage I processing in the previous sampling cycle and is being used for Stage II processing.

For Stage III processing, all IAs to each TN on the Monitoring List are logged for the duration of the sampling cycle (block 112). A TN remains on the Monitoring List until the IA rate remains below a release threshold for a set number of cycles (blocks 114; 116). At the end of each sampling cycle, each TN remaining on the Monitoring List is reported to the NP as a continuing MCE (block 118).

A switch which reports a new MCE or a continuing MCE may be referred to as a "detecting switch".

From the foregoing, it will be apparent that it will take at least two sampling cycles to detect a focussed MCE. During the first sampling cycle, a TN which is newly subject of an MCE may find its way onto the Suspect List as a result of Stage I processing; during the next sampling cycle, this Suspect List will be used in Stage II processing and will result in an alert being sent to the NP.

The length of the sampling cycle and sampling window is dependent upon the processing capabilities of, and load on, the switch. For a DMS™ switch having a load of 100,000 calls per hour, the sampling cycle is preferably from ten to thirty seconds long and the sampling window is preferably three seconds long. This sampling window achieves an acceptable balance between the rate of false detections and resource use. In order to achieve an occupancy of 99% for lines with a mean holding time of five seconds, the desired IA rate should be approximately three calls per second. Thus, the alert threshold IA rate for a TN which will result in reporting the TN to the NP, while dependent upon the network configuration and requirements should normally be chosen as a rate which is greater than this rate. The release threshold to remove the TN from the Monitoring List is preferably one order of magnitude less than the alert threshold. The NP sets these thresholds uniformly throughout the network.

For a switch which is capable of processing 600,000 calls per hour, such as a DMS™ switch, the IA List and Frequency List preferably accommodate seventy TNs, the Suspect List preferably accommodates five TNs and the Monitoring List, ten TNs. An IA List holding seventy numbers should catch most IAs for such a switch where the sampling window is three seconds long (on the basis that such a switch may process upwards of 500 calls in a three second period and the IA rate will generally not exceed about 10% of calls). The Frequency List must be kept sufficiently small so that there is time to sort the list to find the TNs with the worst IA rates before the beginning of Stage II processing. The size of the Suspect List and Monitoring List are kept small to minimize processing. If there are less than five TNs on the Frequency List in a given cycle, all are added to the Suspect List; it is only in the unlikely event that this number is greater than five that the TNs with the worst IA records are selected. In this unlikely event, the MCE TNs that do not get on the Suspect List in one cycle are likely to reach the Suspect List during the next cycle, for reasons which will become apparent hereinafter.

Although the sampling cycle is uniform network-wide, the switches will normally not be synchronised with each other so that, while their cycles will be of the same length, the beginning time of their cycles may vary. This has no negative impact on the operation of the system.

After an MCE is reported to an NP, the NP puts in place a dynamically controlled access (DCA) scheme for the TN to control the MCE. To facilitate DCA, whenever a TN is reported by a detecting switch to the NP (either by virtue of being on a Suspect List or a Monitoring List), the TN is reported by way of a message which includes the number of IAs to the TN broken down to (i) IAs for calls which arrived at the switch from DCA trunks 22 (for each DCA network to which the switch belongs); (ii) IAs for calls which arrived from non-DCA trunks 23; and (iii) IAs for calls from lines 18 local to the detecting switch. If a detecting switch is a member of more than one DCA network, then the switch reports to the NP of each DCA network to which it belongs.

MCE Control on a Switch

Figure 2B:
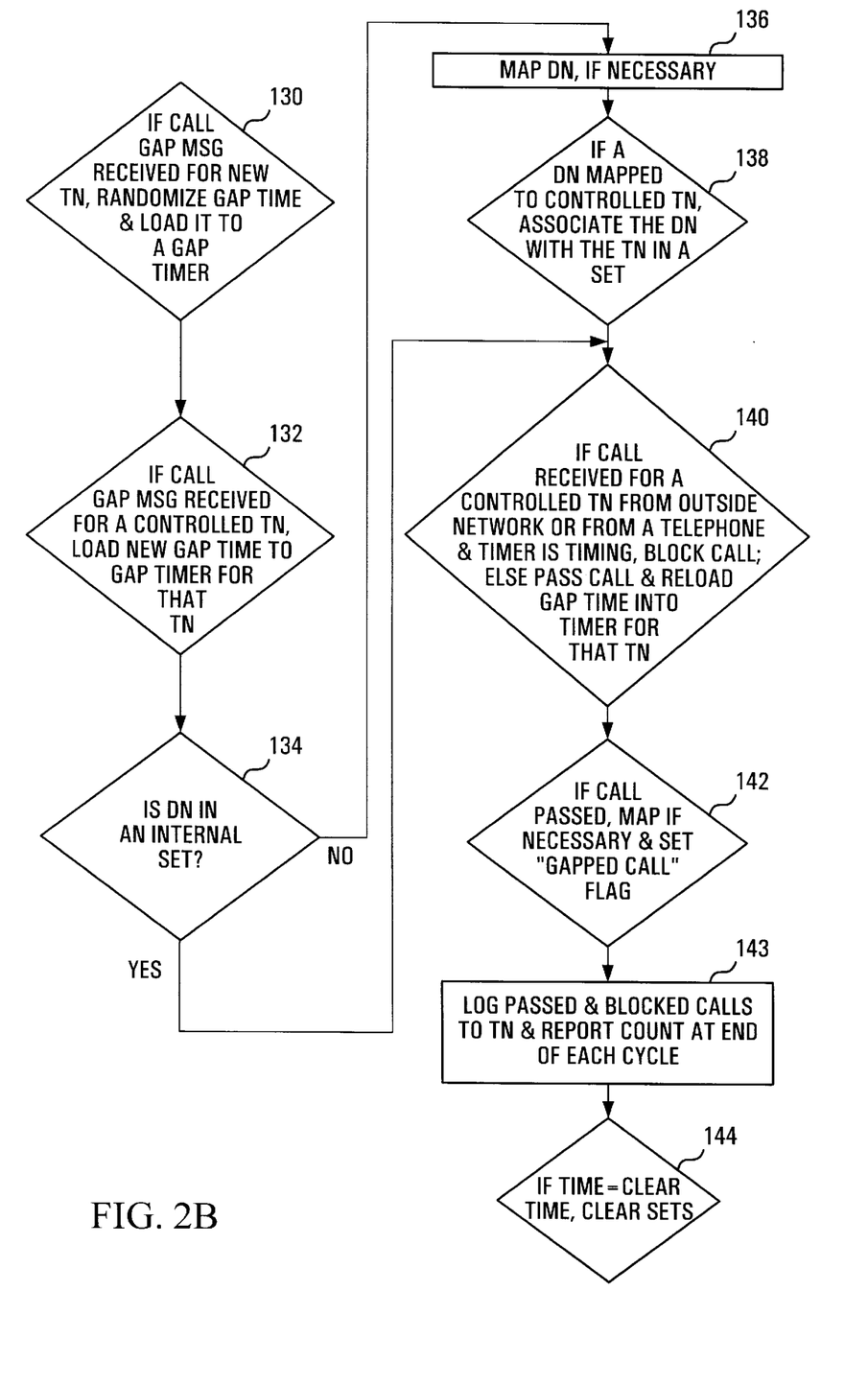
Figure 3:
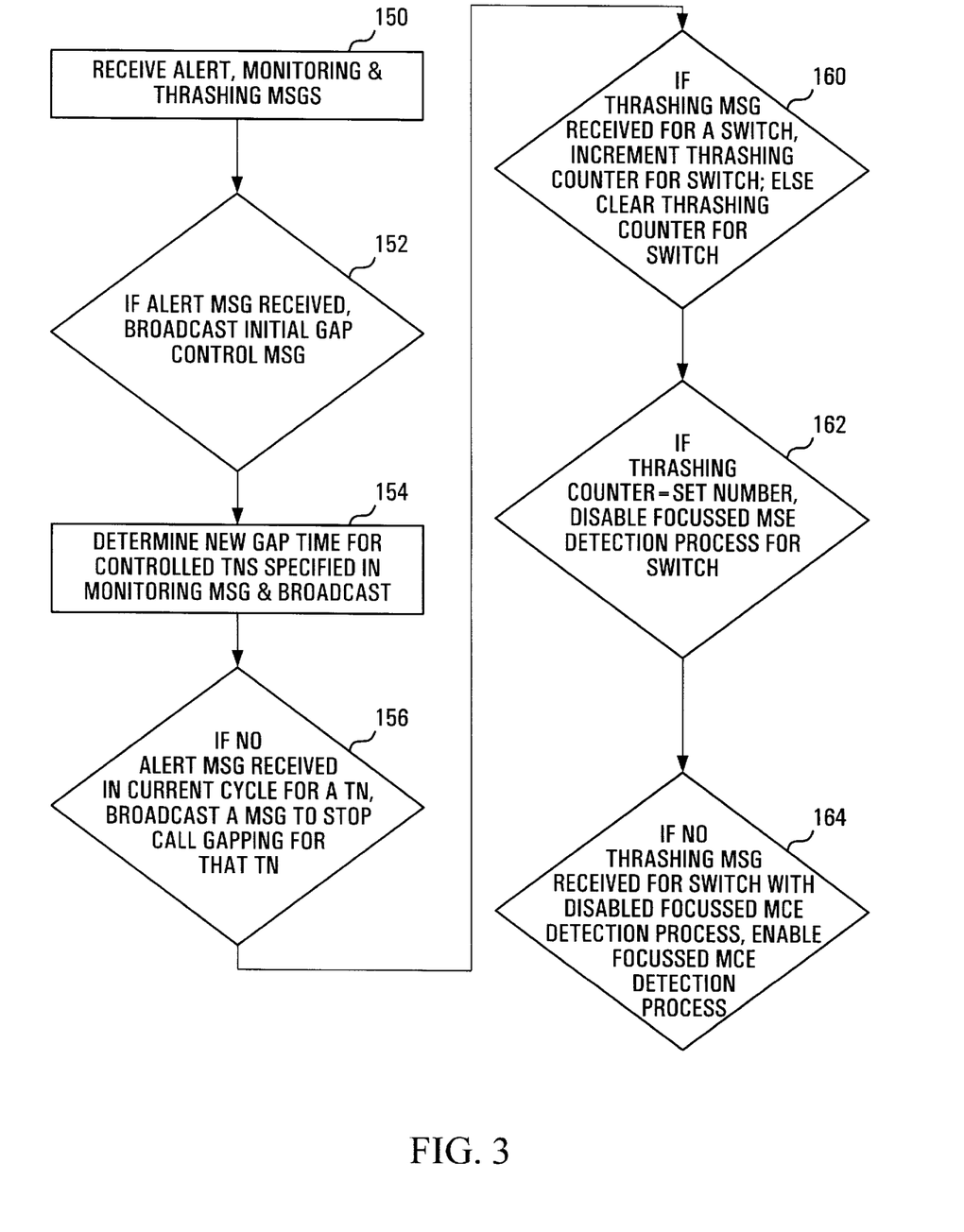
FIG. 3 is a flow diagram for the program control of network processors of FIG. 1.

When the NP receives an MCE message relating to a new TN, it immediately broadcasts a gap control message to all switches on the network (FIG. 3: blocks 150, 152). This gap control message specifies the TN and a standard initial call gap for the TN. For example, this initial call gap may be 0.1 seconds. This information is used by the network switches to throttle the number of calls to the TN in order to avoid network congestion. More particularly, referencing FIG. 2b, after a network switch receives a call gap message for a TN from the NP, it loads the call gap specified in the message into a call gap timer created for the TN (blocks 130, 132) and blocks all calls it receives which are destined to this TN before the timer times out. After the timer times out, the switch will handle the next call to this TN in a normal fashion but will simultaneously reload the call gap timer with the gap time so that, again, future calls to the TN are blocked until the timer again times out (block 140). In this way, a guard time is placed between calls to the TN. However, a call to a TN is only subject to gapping when it first enters the network either because the call arrives at a network switch from a source (e.g., telephone) serviced by the network switch or from a trunk from outside the network; if the call to the TN arrives at a network switch from a DCA trunk (i.e., it came from another switch in the network), it is assumed to have already been gapped and is therefore handled by the switch at which it arrives as a call which is not to be blocked. (For example, after switch 16A receives a gap control message from NP 26a, it will apply controls to calls from the trunk 22 between switch 16A and switch 16H but not to calls from the DCA trunk 22 between switch 16A and switch 16C.) This is necessary to ensure single network control.

A switch which applies controls to call may be referred to as a controlling switch.

When a switch in a given network X first receives a command to apply call gapping to a TN along with the initial gap time, the switch applies a random multiplier of between 0 and 1 to the initial gap time and loads this randomised gap time to the gap timer (block 130). Subsequently, the switch loads the actual gap times to the timer. By randomising the first gap time in respect of a TN, network-wide call bursts at the end of each gap time are avoided.

MCE Control Gap Computations on an NP

Turning to FIG. 3, in subsequent sampling cycles, the NP for network X receives IA counts from one or more network detecting switches in respect of a TN which is subject of gapping (block 150). The NP uses this new information to calculate a new call gap for the TN, as follows:

$$gap_i = \begin{cases} 1 \Big/ \left( \frac{overflowTarget - IA_x}{n \cdot updateCycle} + \frac{1}{gap_{i-1}} \right) & \text{if } \left( \frac{overflowTarget - IA_x}{n \cdot updateCycle} + \frac{1}{gap_{i-1}} \right) > 0 \\ maxGap & \text{otherwise} \end{cases}$$

where:

$gap_i$ is the gap calculated for the current cycle;

$gap_{i-1}$ is the gap for the previous cycle;

overflowTarget is the desired number of IAs for the TN, this may be 2.5 calls/second;

$IA_x$ is the IA count in network X for the TN;

n is the number of switches in the network;

updateCycle is the sampling cycle which, as mentioned hereinbefore, is preferably between ten and thirty seconds; and maxGAP is a pre-defined maximum gap, this may be 600 seconds. (A minimum gap should also be pre-defined; this may be 0.1 seconds.)

Regarding the determination of $IA_x$, it is first noted that where an MCE is sufficiently large, the MCE may be detected on more than one switch in a network. If so, the largest IA count received by the network NP is used in determining $IA_x$. This requires that the NP wait one sampling cycle so that it has reports from all detecting switches before calculating the gap value for the update cycle.

Generally, $IA_x$ is simply the IA count received from the detecting switch reporting the largest IA count. However, if the detecting switch is a member of more than DCA network (such as switch 16D), the IA count for the switch should be adjusted downwardly to account for the fact that IAs from lines and from non-DCA trunks will be higher because of this fact. More particularly, an adjusted IA count for the switch, when reporting to the NP of network "x", may be determined as follows:

$$IA_{adjusted} = DCAtrIA_x + (LnIA + non\text{-}DCAtrIA) \cdot \left( DCAtrIA_x \bigg/ \left( \sum_{j=1}^{N} DCAtrIA_x[j] \right) \right)$$

where the summation sums the DCA trunk IAs received by the switch for each network to which the switch belongs, "N" being the number of DCA networks of which the switch is a part.

By way of example, assume switch 16D received 2 IAs on the trunk from switch 16C (which are DCAtrIAs for network 10A), 4 IAs on the trunk from switch 16I (which are DCAtrIAs for network 10D), 5 IAs on the trunk from switch 16E (which are non-DCAtrIAs), and 10 IAs from line 18d (which are LnIAs). Then, after switch 16D reported to NP 26a, this NP would calculate the adjusted IA for the switch as follows:

$$IA_{adjusted} = 2 + (10+5)*2/(2+4) = 7$$

Switch 16D would also report to NP 26d and this NP would calculate the adjusted IA for the switch as follows:

$$IA_{adjusted} = 4 + (10+5)*4/(2+4) = 14$$

From this example, it will be apparent that since the IA "traffic" to switch 16D on network 10D is twice that of the IA "traffic" to the switch on network 10A, twice the number of line and non-DCA trunk IAs are attributed to network 10D.

To avoid putting the system at risk of instability when the gap value varies too much from one cycle to the next, the following smoothing formula can be employed:

$$gap_{weighted} = \left(1 - \frac{wf}{100}\right) \cdot gap_{i-1} + \frac{wf}{100} \cdot gap_i$$

where wf=100% is recommended, but field experience might prove it necessary to smooth the system response with a lesser value.

Gapping Fairness

Switches supporting much larger number of lines than average, may be penalized systematically in times of congestion. To be fair in such a situation, an array, fairFactor[ ], of fairness factors with values specific to each switch, may be maintained. The factors are proportional to the amount of the traffic towards the MCE TN that passes through the switch. Before dispatching the gap requests to the switch, the NP divides the gap value by the fairness factor of the switch. The default value of each of the fairness factors is 1.0 and the sum of all fairness factors is n, the number of switches in the network. The use of fairness factor can be disabled by the user.

The fairness factors can be computed automatically for each update cycle, based on the number of attempts on the MCE TN for each switch. This allows the network to adapt itself dynamically to the changes in traffic patterns during the progress of an MCE. The approach is described as follows.

Each switch, s, which applies DCA call gapping in respect of a TN, reports the following information to the NP on a periodic basis (FIG. 2b: block 143):

Number of calls to that TN that are blocked by the DCA gap controls CountBlock[s]

Number of calls to the TN that pass the gap controls CountPass[s]

Where the blocked and passed calls are a result of the application of the call gapping process. This information is reported at the end of each sampling cycle (when the switch is reporting any alert messages and TNs on its monitoring list).

The number of MCE TN attempts at switch s is then CountBlock[s]+CountPass[s]. The fairness factor fairFactor[s] for switch s depends on the proportion of the MCE TN attempts on switch s with respect to the average number of attempts per switch within the network:

$$fairFactor[s] = (CountPass[s] + CountBlock[s]) \bigg/ \left( \frac{\sum_{z=1}^{n} (CountPass[z] + CountBlock[z])}{n} \right)$$

This formula could result in sudden fluctuation in the fairness factor value, and, consequently in the gap value. This could happen if/when the traffic pattern is unstable within the network. To prevent these fluctuations a fairness weighting factor, with a value between 0 and 1, can be used along with the old value of the fairness factor. Note that the condition that the sum of all fairness factors equal to n is preserved. Another way to prevent fluctuations is to use a longer update cycle for re-evaluating fairFactor[s]. The gap value for switch s, $gap_{fair}[s]$ is based on the fairness factor fairFactor[s] and the computed gap as follows:

$$gap_{fair}[s] = \begin{cases} minGap & \text{if } fairFactor[s] = 0 \\ gap_{weighted}/fairFactor[s] & \text{if } fairFactor[s] > 0 \end{cases}$$

The gap value must be capped within the user specified minimum and maximum values. The gap dispatched to switch s, $gap_{applied}[s]$, i then:

$$gap_{applied}[s] = min(max(gap_{fair}[s], minGap), maxGap)$$

Once the new gap time for a controlled TN is determined for the network (or, where for fairness reasons, a new gap time for the controlled TN is determined for each of the network switches), an appropriate new gap control message (or messages) are sent to the network switches (block 154).

The automatic call gapping messages broadcast by an NP can be turned off manually for some TNs (e.g., the TN for the police).

A switch only reports a TN to the NP when it is transferred to the switch's Monitoring List in a cycle or remains on the switch's Monitoring List in the cycle. Once an MCE in respect of a TN ends, the TN will drop off the Monitoring Lists of the switches and will cease being reported to the NP (optionally, a switch may send an "MCE Clear" message when the TN drops off its Monitoring List). Once the NP no longer receives a report in respect of a TN from any switch, it broadcasts a message causing the switches to cease call gapping in respect of the TN (block 156).

Set Based Controls

It is possible for different destination numbers (DNs) to terminate on the same TN (for example, a 1-800 number and its local equivalent). The translation of a DN to a TN is performed by existing known switch utilities. To ensure proper operation, any gapping control for a TN should be applied to the entire set of DNs which are mapped to that TN. Since associated DNs are local to the switch(es) which map a DN to another DN, proper operation in respect of associated DNs is guaranteed if call gapping is applied after mapping in the switch. However, call gapping after mapping is not efficient since mapping usually involves translation (e.g., parsing the DN or utilising a look-up table) and may require a query by the switch to an off-switch network element (as, for example, a query to a switch control point in an intelligent network). Consequently, it is preferred that, where possible, a switch applies call gapping before mapping a DN. In any event, whether calls are gapped before or after mapping, for proper operation, a call should be subject of gapping controls exactly once. Referring to FIG. 2b, when a call to a DN arrives at a switch, say a call to "DN1", the switch may map DN1 to a controlled TN (block 136), say "TN1". At that point the switch adds DN1 to an internal set of DNs associated with TN1 (block 138) and then applies call gapping to the call (block 140). When another call arrives, the switch checks the DN for the call against each TN subject of call control as well as the DNs associated with each controlled TN by way of the internal sets created by the switch. Thus, when another call to DN1 arrives, it is immediately subject of gapping prior to its mapping to TN1 (blocks 134, 140). If this call is blocked, processing of the call ends without need to map DN1 to TN1. If the call is not blocked, a flag is set in the switch in relation to the call indicating the call has been subject of gapping so that the call will not again be subject of gapping after mapping (block 142). Since a mapping from a DN to another DN in a switch is generally time dependent, the internal set is cleared each time a pre-selected clear time interval elapses (block 144). (It is also because of the dynamic nature of a mapping that it is not safe to use the internal set for mapping DNs.)

A switch (such as switch 16D) may participate in more than one network which is subject of call gapping control. In such case, when more than one NP requests control on the same TN, the most restrictive gap value is used by the switch. To resolve activation conflicts (such as where one NP identifies a switch as thrashing and instructs the switch to cease its focussed MCE detection process whereas another instructs the switch to re-institute its focussed MCE detection process), one of the NPs is designated as the master NP for the switch; in situations which could result in conflict, the switch only responds to the master NP.

Thrashing

A switch may be subject of an abnormally high rate of IAs which result from general switch congestion and are not focussed on any particular TN or TNs. This non-focussed MCE is known as thrashing. To monitor for thrashing, each switch tracks the total number of switch-wide IAs each cycle (FIG. 2a: block 120). If the total number of IAs exceeds an office thrashing threshold, the switch notifies the NP (FIG. 2a: block 122). If the NP receives such a notification from a switch in each of a pre-selected number of consecutive cycles, then the NP turns off the focussed MCE detection process for that switch in order to preserve switch resources (FIG. 3: blocks 160, 162). This does not effect call gap controls for a switch so that any existing call gapping control on the switch continues and the switch may also receive, and act upon, new call gapping messages. After the focussed MCE detection process is turned off, the switch reports only the total number of switch-wide IAs. When this falls below a threshold, the NP can re-initiate the focussed MCE detection process for the switch (FIG. 3: block 164). The value of the office alert threshold depends upon the traffic mix in the switch and the "normal" proportion of busy lines based on subscriber type.

A switch tracks the time during which the thrashing threshold is continuously exceeded. If the NP fails to instruct the switch to stop focussed MCE detection and this time exceeds a threshold, the switch stops focussed MCE detection on its own and re-initiates same only when the non-focussed MCE falls below the thrashing threshold for a pre-selected amount of time.

Modifications will be apparent to those skilled in the art and, therefore, the invention is defined in the claims.

What is claimed is:

1. A method for handling a mass calling event (MCE) at a switch of a network, comprising the steps of, repetitively:
   (a) logging ineffective attempts (IAs) to terminating numbers (TNs) which are on a monitoring list;
   (b) sending a monitoring message to a network processor (NP) with the IA rate for each TN on said monitoring list;
   (c) if, based on IAs logged in step (a), an IA rate in respect of a monitored TN is below a release threshold for a pre-determined time, removing said monitored TN from said monitoring list;
   (d) logging IAs to TNs on a suspect list, said suspect list having TNs not on said monitoring list;
   (e) if, based on IAs logged in step (i), an IA rate in respect of a TN exceeds an alert threshold, sending an alert message to said NP and storing said TN on said monitoring list;
   wherein each of (d) and (e) is undertaken during each of consecutive sampling cycles, said suspect list of (e) is a suspect list created in a sampling cycle immediately preceding a current sampling cycle and including, in said current sampling cycle:
   (A) logging IAs to TNs not on said preceding sampling cycle suspect list and not on said monitoring list;
   (B) if one or more TNs have an IA rate exceeding a threshold, transferring at least one of said one or more TNs to a current sampling cycle suspect list.

2. The method of claim 1 wherein (A) is undertaken during a sampling window which lasts for a time less than said sampling cycle.

3. A method for handling a mass calling event (MCE) at a switch of a network, comprising the steps of, repetitively:
   (a) logging ineffective attempts (IAs) to terminating numbers (TNs) which are on a monitoring list;
   (b) sending a monitoring message to a network processor (NP) with the IA rate for each TN on said monitoring list;
   (c) if, based on IAs logged in step (a), an IA rate in respect of a monitored TN is below a release threshold for a pre-determined time, removing said monitored TN from said monitoring list;
   wherein said IA rate for each TN comprises (i) IAs to said each TN resulting from calls arriving at said switch on trunks from other switches in networks to which said switch belongs, (ii) IAs to said each TN resulting from calls arriving at said switch on local lines, and (iii) IAs to said each TN resulting from calls arriving on trunks from outside of networks to which said switch belongs.

4. A method for handling a mass calling event at a network processor (NP) of a network, comprising the steps of:

receiving a monitoring message from at least one switch of said network specifying a controlled terminating number (TN), a number of calls blocked by said at least one switch due to application of a call gapping process and a number of calls passed by said at least one switch due to application of said call gapping process;

broadcasting a call gapping message to switches on said network indicating a call gap to be applied to calls to said controlled TN, said call gap differing from switch to switch and, for a given switch, being based on a proportion of a sum of a number of calls to said controlled TN blocked and passed by said given switch to a sum of a number of calls to said controlled TN which are blocked and passed network-wide.

5. A method for dynamically controlling access to a terminating number (TN) subject of a mass calling event (MCE) at a network processor (NP) of a first network, comprising the steps of:

receiving a count of ineffective attempts (IAs) to the MCE TN from a first network detecting switch;

determining an adjusted IA count as a sum of:
(i) IAs to said MCE TN resulting from calls arriving at said detecting switch on trunks from other switches in said first network and
(ii) a portion of a sum of:
(A) IAs to said MCE TN resulting from calls arriving at said detecting switch on local lines and
(B) IAs to said MCE TN resulting from calls arriving on trunks from outside of networks to which said detecting switch belongs determined by a ratio of:
(I) IAs to said MCE TN resulting from calls arriving on trunks from other switches in said first network to
(II) a sum comprised of, for each network of which said detecting switch is a part and which dynamically controls access to said MCE TN, IAs to said MCE TN resulting from calls arriving on trunks from other switches in said each network;

determining a call gap to apply to switches in said first network based on said adjusted IA count and;

broadcasting a call gap message based on said call gap to switches in said first network.

6. A method for handling a mass calling event (MCE) at a switch of a network, comprising:
(i) during a current sampling cycle, logging IAs to TNs not on a monitoring list and not on a previous suspect list during a sampling window having a duration less than a duration of said current sampling cycle and listing in a current suspect list TNs and associated IAs for said listed TNs which TNs have the greatest number of associated IAs;
(ii) logging IAs to each TN on said previous suspect list for a full duration of said current sampling cycle, said previous suspect list developed during a previous sampling cycle; and
(iii) if, based on IAs logged in (ii), an IA rate in respect of a TN on said previous suspect list exceeds an alert threshold, sending an alert message to said NP and storing said TN on said monitoring list.

7. The method of claim 6 wherein (i), (ii), and (iii) are repeated in a subsequent sampling cycle in which said subsequent sampling cycle is considered as a new current sampling cycle and said current suspect list is considered as a new previous suspect list.

8. The method of claim 6 further comprising, repetitively:
(a) logging ineffective attempts (IAs) to terminating numbers (TNs) which are on said monitoring list;
(b) sending a monitoring message to a network processor (NP) with the IA rate for each TN on said monitoring list;
(c) if, based on IAs logged in step (a), an IA rate in respect of a monitored TN is below a release threshold for a pre-determined time, removing said monitored TN from said monitoring list.

9. The method of claim 6 wherein (I) comprises sorting TNs by number of IAs to create a sorted list and choosing a pre-determined number of TNs from said sorted list having the greatest number of IAs for listing in said current suspect list.

10. A computer readable medium containing computer readable instructions which, when loaded into a network switch, causes said switch to, repetitively:
(a) log ineffective attempts (IAs) to terminating numbers (TNs) which are on a monitoring list;
(b) send a monitoring message to a network processor (NP) with the IA rate for each TN on said monitoring list;
(c) if, based on IAs logged in step (a), an IA rate in respect of a monitored TN is below a release threshold for a pre-determined time, remove said monitored TN from said monitoring list;
(d) log IAs to TNs on a suspect list, said suspect list having TNs not on said monitoring list;
(e) if, based on IAs logged in step (i), an IA rate in respect of a TN exceeds an alert threshold, send an alert message to said NP and storing said TN on said monitoring list; and
(f) undertake each of (d) and (e) during each of consecutive sampling cycles, such that said suspect list of (e) is a suspect list created in a sampling cycle immediately preceding a current sampling cycle and, in said current sampling cycle:
(A) log IAs to TNs not on said preceding sampling cycle suspect list and not on said monitoring list; and
(B) if one or more TNs have an IA rate exceeding a threshold, transfer at least one of said one or more TNs to a current sampling cycle suspect list.

11. The computer readable medium of claim 10 wherein (A) is undertaken during a sampling window which lasts for a time less than said sampling cycle.

12. A computer readable medium containing computer readable instructions which, when loaded into a network switch, causes said switch to, repetitively:
(a) log ineffective attempts (IAs) to terminating numbers (TNs) which are on a monitoring list;
(b) send a monitoring message to a network processor (NP) with the IA rate for each TN on said monitoring list;

(c) if, based on IAs logged in step (a), an IA rate in respect of a monitored TN is below a release threshold for a pre-determined time, remove said monitored TN from said monitoring list;

wherein said IA rate for each TN comprises (i) IAs to said each TN resulting from calls arriving at said switch on trunks from other switches in networks to which said switch belongs, (ii) IAs to said each TN resulting from calls arriving at said switch on local lines, and (iii) IAs to said each TN resulting from calls arriving on trunks from outside of networks to which said switch belongs.

13. A computer readable medium containing computer readable instructions which, when loaded into a network processor (NP) for a network, causes said NP to:

receive a monitoring message from at least one switch of said network specifying a controlled terminating number (TN), a number of calls blocked by said at least one switch due to application of a call gapping process and a number of calls passed by said at least one switch due to application of said call gapping process;

broadcast a call gapping message to switches on said network indicating a call gap to be applied to calls to said controlled TN, said call gap differing from switch to switch and, for a given switch, being based on a proportion of a sum of a number of calls to said controlled TN blocked and passed by said given switch to a sum of a number of calls to said controlled TN which are blocked and passed network-wide.

14. A computer readable medium containing computer readable instructions which, when loaded into a network processor (NP) of a first network, causes said NP to:

receive a count of ineffective attempts (IAs) to the MCE TN from a first network detecting switch;

determine an adjusted IA count as a sum of:

(i) IAs to said MCE TN resulting from calls arriving at said detecting switch on trunks from other switches in said first network and (ii) a portion of a sum of:

(A) IAs to said MCE TN resulting from calls arriving at said detecting switch on local lines and (B) IAs to said MCE TN resulting from calls arriving on trunks from outside of networks to which said detecting switch belongs determined by a ratio of:

(I) IAs to said MCE TN resulting from calls arriving on trunks from other switches in said first network to (II) a sum comprised of, for each network of which said detecting switch is a part and which dynamically controls access to said MCE TN, IAs to said MCE TN resulting from calls arriving on trunks from other switches in said each network;

determine a call gap to apply to switches in said first network based on said adjusted IA count and;

broadcast a call gap message based on said call gap to switches in said first network.

15. A method for dynamically controlling access to a terminating number (TN) subject of a mass calling event (MCE) at a network processor (NP) of a network, comprising:

receiving from a reporting switch in said network, a count of ineffective attempts (IAs) to said TN;

determining a call gap to permit between calls to said TN ($gap_i$) in accordance with the following:

$$gap_i = \begin{cases} 1 \Big/ \left( \frac{overflowTarget - IA_x}{n \cdot updateCycle} + \frac{1}{gap_{i-1}} \right) & \text{if } \left( \frac{overflowTarget - IA_x}{n \cdot updateCycle} + \frac{1}{gap_{i-1}} \right) > 0 \\ maxGap & \text{otherwise} \end{cases}$$

where:
$gap_i$ $p_i$ is the gap determined for the current cycle;
$gap_{i-1}$ is the gap for the previous cycle;
overflowTarget is the desired number of IAs for the TN;
$IA_x$ is the IA count from said reporting switch;
n is the number of switches in the network;
updateCycle is the duration of a sampling cycle; and
maxGAP is a pre-defined maximum gap;

broadcasting said determined gap ($gap_i$) to switches in said network.

16. A computer readable medium containing computer readable instructions which, when loaded into a network processor (NP) of a network, causes said NP to:

receive from a reporting switch in said network, a count of ineffective attempts (IAs) to a terminating number (TN);

determine a call gap to permit between calls to said TN ($gap_i$) in accordance with the following:

$$gap_i = \begin{cases} 1 \Big/ \left( \frac{overflowTarget - IA_x}{n \cdot updateCycle} + \frac{1}{gap_{i-1}} \right) & \text{if } \left( \frac{overflowTarget - IA_x}{n \cdot updateCycle} + \frac{1}{gap_{i-1}} \right) > 0 \\ maxGap & \text{otherwise} \end{cases}$$

where:
$gap_i$ $p_i$ is the gap determined for the current cycle;
$gap_{i-1}$ is the gap for the previous cycle;
overflowTarget is the desired number of IAs for the TN;
$IA_x$ is the IA count from said reporting switch;
n is the number of switches in the network;
updateCycle is the duration of a sampling cycle; and
maxGAP is a pre-defined maximum gap;

broadcast said determined gap ($gap_i$) to switches in said network.

* * * * *